Feb. 8, 1938.  J. T. STUBBINS  2,107,350
SIGNAL DEVICE
Filed June 19, 1936  2 Sheets-Sheet 1
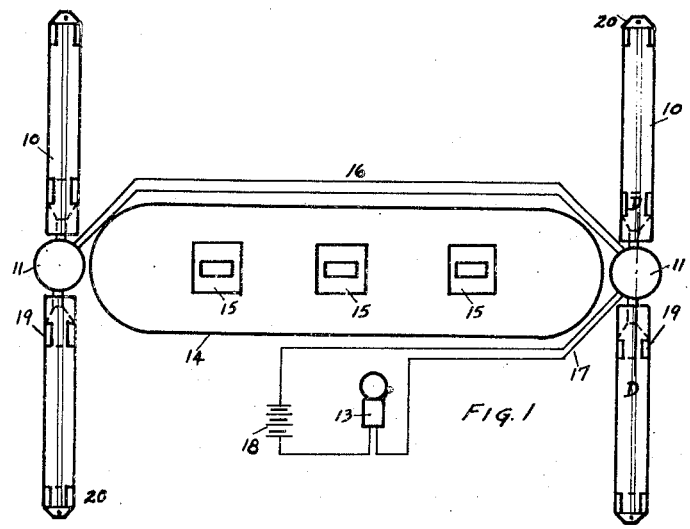
Fig. 1
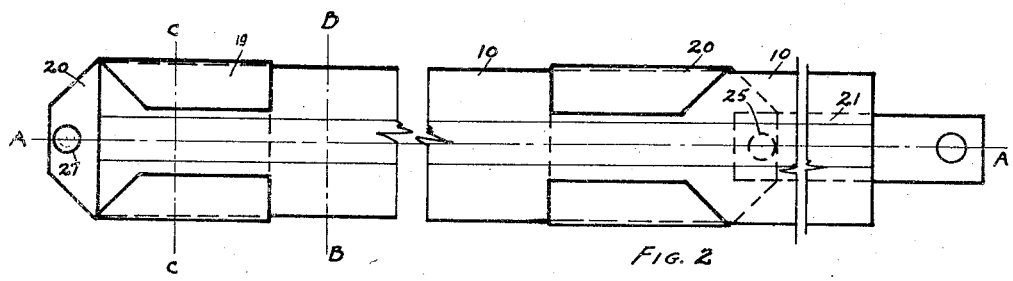
Fig. 2
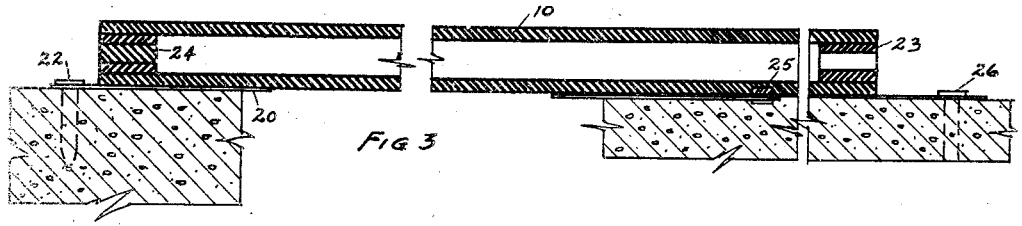
Fig. 3
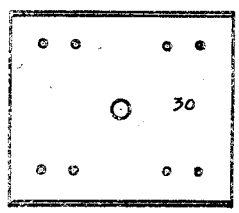
Fig. 6
Fig. 7
Fig. 4
Fig. 5
Inventor
John Thomas Stubbins
Francis J. Klempay
By
Attorney Feb. 8, 1938. J. T. STUBBINS 2,107,350
SIGNAL DEVICE
Filed June 19, 1936 2 Sheets-Sheet 2

Inventor
John Thomas Stubbins
Francis J. Klempay
By
Attorney

Patented Feb. 8, 1938

2,107,350

UNITED STATES PATENT OFFICE 2,107,350

SIGNAL DEVICE

John Thomas Stubbins, Youngstown, Ohio

Application June 19, 1936, Serial No. 86,118

14 Claims. (Cl. 200—86)

This invention relates to the art of signalling and more particularly to a device which will cause a signal to be actuated when an object impinges on an element of the device.

The primary object of this invention is to provide a signalling system which is very simple in construction, requiring a minimum of repair and adjustment and which may be economically manufactured and easily installed.

Another object of my invention is to provide a flexible pneumatic tube adapted to be engaged by the wheel of a vehicle or other object which will offer a minimum of resistance to the wheel or object but which can be more economically manufactured than any satisfactory tube heretofore used for the purpose.

Another object of my invention is to provide a signalling system requiring no special tools for its installation and which does not violate any known electrical safety code in its installation or operation.

A further object of this invention is to provide novel connecting and securing means for the ends of the pneumatic tubes whereby the controlling unit embodying the diaphragm actuated switch may be readily removed from and installed in the system and whereby the lengths of the pneumatic tubes may be varied with facility.

A further object of this invention is to provide means to cause the signal to discontinue its functioning a predetermined time after an object engages the actuating pneumatic tube even though the object remains at rest on the tube.

A still further object of this invention is to provide a signalling system which is effectively sealed against the entrance of dust, oil, snow, rain, ice, or sleet, rendering it especially useful for outdoor installations.

A still further object of this invention is to provide means to effectively filter air which must necessarily be taken into the system.

A still further object of this invention is to provide an arrangement for the responsive tubes of the system whereby the use of a minimum number of standard lengths of tubes will result in a signal being given whenever a vehicle comes near the pumps of a filling station.

Other objects and advantages will become apparent from a consideration of the drawings and the following specification. Changes in the specific form of my invention as herein disclosed may be made within the scope of my invention as bounded by the appended claims.

In the drawings:

Figure 1 is a plan view of an installation, embodying my invention, as applied to a gasoline filling station.

Figure 2 is an enlarged plan view of the pneumatic tube showing the securing means therefor in detail.

Figure 3 is a longitudinal sectional view of the pneumatic tube, taken along the line A—A of Figure 2.

Figure 4 is a transverse sectional view of the pneumatic tube, taken along the line B—B of Figure 2.

Figure 5 is a transverse sectional view of the pneumatic tube and the securing plate, taken along the line C—C of Figure 2.

Figures 6 and 7 are plan and end views, respectively, of a tube connecting plate.

Figure 8:
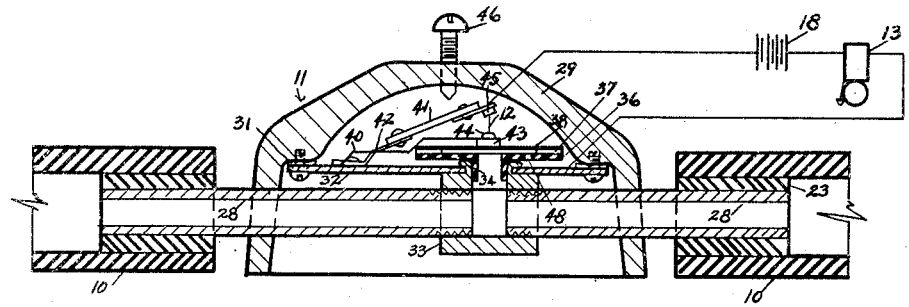
Figure 8 is a cross-sectional view of the control unit taken along the line D—D of Figure 1.

The signalling system of this invention consists generally of a pneumatic tube 10, closed at one end and communicating at its other end with a control unit 11 which is provided with a diaphragm operated switch 12 to control the circuit of an alarm device 13.

Figure 1 illustrates a desirable installation of the system as applied to a gasoline filling station which is provided with an island or other area 14 having a plurality of pumps 15 positioned thereon and driveways on each side of the island or area. At each end of the island or area there is placed a control unit 11 where it is ordinarily inaccessible to the wheels of vehicles. Connected to the control unit 11 at diametrically opposed points thereof are the pneumatic tubes 10 which extend at right angles to the longitudinal axis of the island or area and across the driveways. With this arrangement any vehicle coming near the pumps 15 must obviously pass over one or the other of the sensitive pneumatic tubes 10 and actuate the signal. This arrangement is a decided improvement over any layout heretofore used for the purpose.

The pneumatic tubes 10 are preferably made of rubber and have a cross-sectional shape as indicated in Figure 4. As shown, the lower surface of the tube is flat and has a width substantially greater than the width of the top of the tube. The sides of the tube are beveled toward each other and the result is such that the tube remains in its original position when passed over by the wheels of a vehicle. The cross-sectional shape of the opening through the tube, as shown by Figure 4, has been found to give the best results as it renders the tube more responsive to a weight placed thereon while providing a base of substantial width for the tube. In order that the tube may be economically manufactured, as by extrusion, for example, the cross-sectional shape of the opening must be uniform throughout its length. The shape of the opening as shown does not lend itself to connection with adjoining tubes or the control unit by the use of inexpensive nipples or metal tubes of standard shape. To obviate this difficulty, I insert a rubber plug 23, Figures 3 and 5, in the end of each length of tubing and secure the same by vulcanizing or otherwise. The plug 23 is provided with a circular opening therethrough to accommodate a round connecting tube and has an exterior shape exactly fitting the opening through the tube 10. The plug 23 has the added function of reinforcing the end of the tube where connection is made.

The tubes 10 are secured to the surface of the roadway by plates 20 which lie flat against the roadway and are provided with flanges 19 which are swaged over to securely grip the beveled sides of the tubes at or near the ends thereof. Preferably, the inner surfaces of the flanges 19 and the upper surfaces of the road engaging portions of plates 20 and 30 are roughened by corrugation or perforation in order that they may securely grip and hold the tubing in proper position. The plates 20 are provided with an unflanged end having an opening 27 extending therethrough for a purpose to be later described.

The plate 20 at one end of the tube has pivotally attached thereto a strap 21 which is connected by means of a rivet 25 passing through an opening in the end of the strap and the opening 27 above mentioned. The other end of the strap is attached to the roadway by a single nail 26 which is driven into the surface of the roadway. The nail 26 also fastens the strap 21 of another tube section which is longitudinally aligned but spaced from the first tube section to provide a space for the control unit.

As shown in Figures 1, 2, and 3, the plate 20 adjacent the control unit 11 is placed a substantial distance from the end of tube 10 and the aligned tube sections 10 are pivotally attached to each other by nail 26 and rivets 25. This construction allows the ends of tubes 10 adjacent the control unit 11 to be slightly rotated about a plurality of spaced pivots and enables the adjacent ends of the tubes 10 to be grasped and bent either upwardly or sideways. These features enable the control unit 11, which is provided with diametrically opposed connecting nipples 28, to be readily inserted and removed from between the ends of tube sections 10. This is a material advantage in the servicing of installed systems.

If it is desired to lengthen the pneumatic actuating tube, additional sections may be attached thereto by means of the connecting plate 30 which is provided with a flat portion to rest on the roadway and upwardly extending flanges which are swaged over to grip the beveled sides of the sections at the ends thereof. The ends of a nipple (not shown) are placed in the plugs 23 before the tubes 10 are clamped in member 30. The flat surface of member 30 is provided with an opening at its center whereby a nail passing through the opening may secure it to the surface of the roadway. The end of the tube remote from the control unit is closed by plug 24 inserted in the opening of plug 23. The end is fastened to the roadway at any point necessary by a nail 22 passing through the clamp 20.

With my construction of elements constituting the system it is possible to install systems of various layouts and lengths of responsive units by the use of a plurality of identical tubing sections and connecting plates of but two types, i. e., the plate 20 and the plate 30.

As shown in Figure 8, the control unit 11 consists of an inverted cup-shaped housing 29 having a shoulder on its inner surface to which is secured a metal disk 32. Between the disk and the shoulder there is placed a porous gasket 31 of special design which allows air to pass into and out of the space between the disk 32 and the top of housing 29 but which effectively excludes dust or other impurities. Secured to the disk 32 on the lower face thereof is the block 33 which is provided with opposed threaded openings to accommodate the threaded ends of connecting nipples 28. The block 33 is provided with an integral upwardly extending collar 34 which is rigidly secured in an opening in plate 32 by swaging its end over disk 32 to secure the block 33 to disk 32. Cemented to the swaged over end of the collar 34 is the plastic or hard rubber disk 36 having a depending tapered annular flange at its center which is pressed into the collar 34 of block 33. The disk 36 is provided with a small eccentric opening 48 for a purpose to be later described.

A thin rubber diaphragm 38 is placed over a rubber washer 37 and is cemented thereto. The washer is then cemented to the disk 36. A small leaf spring 40 having one end rigidly fastened to disk 32 carries at its other end one contact 44 of a switch 12. The fiber pad 43 is cemented to the lower side of the end of spring 40 and is adapted to rest lightly on the upper surface of the diaphragm 38.

Also secured to the disk 32 is the leaf spring 42 to which is attached a piece of insulating fiber 41 which carries at its free end the point 45 of silver or platinum constituting the other contact of the switch 12. The adjusting screw 46 is threaded through the top of housing 29 and is adapted to engage the insulating member 41 to vary the distance between the contacts 44 and 45 and alter the sensitivity of the instrument.

Figure 9:
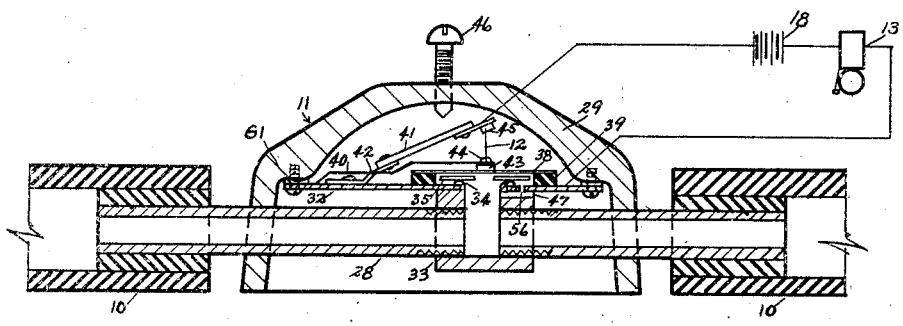
Figure 9 is a cross-sectional view of a modified control unit.
Figure 10:
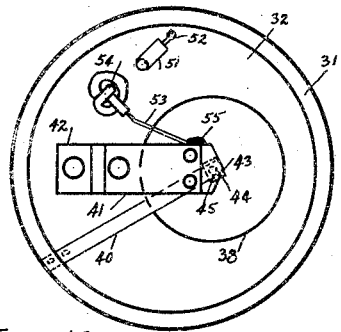
Figure 10 is a detailed plan view of the diaphragm and switch supporting plate of the control unit shown in Figure 8.

Referring to Figure 10, the controlling circuit through the control unit is accomplished by conductors 51 and 53. Conductor 51 is brought up through a small opening in disk 32 and is soldered to disk 32 at 52. The conductor 53 is also brought up through an opening in disk 32 and is soldered to the metallic plate carrying the contact 45. A loop 54 may be placed in the conductors directly above disk 32 to prevent the conductors from being pulled away from their soldered joints. As diagrammatically shown in Figures 8 and 9 a battery 18 and an alarm device 13 is placed in series with the conductors 51 and 53. In installations utilizing a plurality of control units the switches 12 are connected in parallel with each other and in series with the alarm device as by a circuit 16, for example, so that closure of any switch 12 will result in an alarm being given. In actual practice, the conductors of circuit 17 connecting the control unit with the alarm device which will ordinarily be placed within an enclosure at a point removed from the area 14 will be placed in expansion cracks in the concrete of the roadway and cemented over or will be placed in a groove cut in the surface of the roadway and cemented over if other material is used for the roadway or no suitable cracks can be found in the concrete. It is obvious that a step-down transformer may be used in place of the battery 18 for energizing the control circuit. In either event the voltage applied to the control unit 11 is very low, being approximately six volts, and consequently its installation and operation is not regulated by the various electrical safety codes in effect.

The operation of the system is as follows: A vehicle or other object impinging on the pneumatic tube 10 will result in an increase of pressure in the tube and against the sensitive diaphragm 38 which will distend diaphragm 38 and move contact 44 into engagement with contact 45. A circuit is completed through conductors 51, 53, the source of energy 18 and the alarm device 13. The pressure in the system is released through the small hole 48, the excess air being allowed to pass out of the housing through porous gasket 31. The system is so regulated that the pressure in the tube 10 and under diaphragm 38 will return to normal a few seconds after an object is placed on the tube. The result is that the alarm device functions momentarily and then ceases when an object impinges on the tube even though the object remains at rest on the tube. When the object leaves the tube, air is taken into the system through the filtering gasket 31 and hole 48 to make up for the air displaced by the collapse of the tube by the object. To insure proper operation of the delicate diaphragm 38 and to keep the small hole 48 open it is important that only pure air be taken into the system. For this reason the special gasket 31 is highly advantageous.

Figure 9 illustrates a modified form of control unit in which the rubber washer 39 over which is placed and cemented the diaphragm 38 is cemented directly to the disk 32. Disk 32 is secured to the inner shoulder of the member 29 with a conventional gasket 61 interposed therebetween. The washer 39 is of sufficient heighth to enable a fiber washer 35 to be placed beneath the diaphragm 38 and rest on the swaged over end of the collar 34. The fiber washer 35 prevents the diaphragm from sagging and prevents it from contacting any metallic part of the assembly. A small hole 56 is provided in the disk 32 within the confines of the diaphragm 38 to slowly release the pressure in the tube and below the diaphragm 38. The upper end of the block 33 is provided with a small groove 47 communicating with the hole 56 to insure a passage to the atmosphere. The hole 56 and groove 47 perform the same function as does the leak port 48 of Figure 8 but obviously no means is provided in the device of Figure 9 to filter the air taken into the system. The operation of the two devices are otherwise the same.

Having thus fully described my invention what I claim is:

1. In combination with a flexible collapsible pneumatic tube, means for securing one end of said tube to the surface of a roadway comprising a plate having a lower portion to engage the surface of the roadway and upstanding flanges adapted to be swaged over to engage the side walls of the tube, said flanges being spaced from the end of the tube, a strap hinged at one end to said bottom portion and extending beyond the end of the tube, and means to secure the other end of the strap to the roadway.

2. In a signaling system, a pair of spaced longitudinally aligned collapsible pneumatic tubes, means to secure the outer ends of said tubes to the surface of a roadway, means to secure the inner portions of said tubes to the surface of a roadway comprising means to engage the tube at points spaced from the ends of the tubes, the last named means being pivotally connected with the roadway and with each other, a control unit positioned above the pivotal connecting means and between the adjacent ends of the tubes, and means carried by the control unit to connect with the openings in the tubes.

3. A control unit for a signaling system comprising an inverted cup-shaped housing having a shoulder on its inner surface, a disk rigidly secured to said shoulder, a connecting block secured to said disk and depending below said disk, an opening in said disk in communication with a chamber in said block, a connecting nipple extending through a side wall of said block and in communication with said chamber, a non-metallic disk having a central depending annular flange extending through said opening and into said chamber, said non-metallic disk being spaced from said first mentioned disk, a diaphragm secured to said non-metallic disk near the periphery thereof, a small aperture in said non-metallic disk eccentrically disposed but within the confines of the diaphragm, and an alarm controlling device operable by said diaphragm.

4. A control unit for a signaling system comprising a housing having a chamber therein, one wall of said chamber being removable, a diaphragm within said chamber, an alarm controlling device operable by said diaphragm, and a porous filtering gasket between said removable wall and the other walls of the chamber.

5. A control unit for a signaling system comprising an inverted cup-shaped housing having an upper chamber and a lower chamber, a disk fastened within said housing and dividing the chambers, a connecting block in said lower chamber, a connecting nipple secured to said block, a diaphragm in said upper chamber, and an alarm controlling means operable by said diaphragm.

6. A control unit for a signaling system comprising an inverted cup-shaped housing, a disk secured to the inner surface of said housing, a diaphragm between the disk and the upper wall of said housing, a leaf spring secured to said disk and extending above the center of the diaphragm, a contact carried by said leaf spring, a second leaf spring carried by said disk, an insulating member carried by said second spring, a contact carried by said insulating member and adapted to be engaged by said first mentioned contact upon actuation of said diaphragm, an adjusting means passing through a wall of the housing and adapted to engage said insulating member to move the second mentioned contact toward the first mentioned contact.

7. A control unit for a signaling system comprising an inverted cup-shaped housing having a shoulder on its inner surface, a disk secured to said shoulder, a connecting block secured to said disk and having a chamber therein communicating with an opening in the disk, a diaphragm secured to the upper surface of the disk but spaced therefrom to form a chamber in communication with the opening in the disk, a small aperture in the disk eccentrically spaced with respect to the opening in the disk and in communication with the chamber below the diaphragm, said aperture being open to the atmosphere, and an alarm controlling device operable by said diaphragm.

8. In a signaling system, a collapsible pneumatic tube having greater width than height and provided with a flat bottom surface, a convex upper surface and side walls beveled toward each other, the cross-sectional shape of the opening through the tube being similar to the peripheral outline of a cross-section of the tube, the side walls and top wall of the tube being substantially of uniform thickness.

9. A control unit for a signaling system comprising an inverted cup-shaped housing having an upper chamber and a lower chamber, a disk fastened within said housing and dividing the chambers, a diaphragm in said upper chamber, a fluid passage through said disk, a connecting nipple extending into said lower chamber, means connecting the passage within said nipple with said first mentioned passage, and an alarm controlling means operable by said diaphragm.

10. A control unit for a signaling system comprising an inverted cup-shaped housing adapted to lie in intimate contact with the surface of a roadway, a connecting block positioned entirely within said housing, said housing having an opening in its side wall, and a rigid connecting nipple passing through said opening and connected to said block.

11. A control unit for a signaling system comprising an inverted cup-shaped housing, a disk secured to the inner surface of said housing, a diaphragm between the disk and the upper wall of said housing, a flexible carrier within said housing and extending above the center of the diaphragm, a contact carried by said carrier, a leaf spring secured within the housing and supporting a second contact in operative position with respect to the first mentioned contact, said contacts being insulated from each other and adapted to engage each other upon actuation of the diaphragm, an adjusting means passing through a wall of the housing and adapted to move the second mentioned contact towards the first mentioned contact.

12. A control unit for a signaling system comprising an inverted cup-shaped housing adapted to lie in intimate contact with the surface of a roadway, diametrically aligned openings in the side wall of said housing, connecting nipples passing through the openings and secured to a block within said housing, an expansible chamber within the housing above the block, the moving end of said chamber operable to actuate an alarm controlling device positioned within said housing.

13. In a signaling system, the combination of an actuating element comprising a collapsible pneumatic tube having a flat bottom surface, a convex upper surface, the opening through said tube having greater width than height, plugs fitting into the ends of said tube, said plugs having cross-sectional outlines similar to the cross-sectional outline of the opening through the tube, circular openings through said plugs, and means securing said element to the surface of a roadway, said means comprising a plate having a bottom surface adapted to engage the surface of a roadway and upstanding flanges swaged over to engage the side walls of the tube at a point coinciding with the location of one of said plugs whereby said securing means is operative to clamp said plug within said tube.

14. In combination with a collapsible pneumatic tube having a flat bottom surface and a convex upper surface a securing means therefor comprising a flexible metallic plate of uniform thickness having a bottom portion adapted to engage the surface of a roadway and upstanding flanges swaged over to engage the side walls of the tube, and means to secure said plate to the surface of a roadway.

JOHN THOMAS STUBBINS.